United States Patent [19]
Goldberg et al.

[11] Patent Number: 5,146,560
[45] Date of Patent: Sep. 8, 1992

[54] APPARATUS FOR PROCESSING BIT STREAMS

[75] Inventors: Marshall R. Goldberg, Mason, N.H.; Mitchell N. Rosich, Acton, Mass.

[73] Assignee: Digital Equipment Corporation, Maynard, Mass.

[21] Appl. No.: 671,176

[22] Filed: Mar. 15, 1991

Related U.S. Application Data

[63] Continuation of Ser. No. 200,698, May 31, 1989, abandoned.

[51] Int. Cl.⁵ ............................................... G06F 7/38
[52] U.S. Cl. ............................ 395/200; 364/DIG.1; 364/284; 364/284.4; 364/259.2
[58] Field of Search ... 364/200 MS File, 900 MS File, 364/724.01; 395/200

[56] References Cited

U.S. PATENT DOCUMENTS

| | | | |
|---|---|---|---|
| 4,284,976 | 8/1981 | Gable et al. | |
| 4,285,049 | 8/1981 | Bird et al. | 364/900 |
| 4,410,957 | 10/1983 | Cason et al. | 364/900 |
| 4,587,653 | 5/1986 | Hogge, Jr. | 371/6 |
| 4,608,700 | 8/1986 | Kirtley, Jr. et al. | 364/900 |
| 4,754,420 | 6/1988 | Jensen | 364/724.01 |
| 4,817,036 | 3/1989 | Millett et al. | 364/900 |
| 4,852,097 | 7/1989 | Sichart et al. | 371/37.1 |
| 4,856,003 | 8/1989 | Weng | 371/37.1 |
| 4,890,286 | 12/1989 | Hirose | 371/37.1 |

FOREIGN PATENT DOCUMENTS 0190060 8/1986 European Pat. Off.
0223458 5/1987 European Pat. Off.

OTHER PUBLICATIONS

Tanenbaum, A. S., Computer Networks (Prentice-Hall, Inc. 1981), pp. 10-28.
*MOS Microprocessors and Peripherals 1985 Data Book*, pp. 2-50 to 2-86.
Lauck, A. G., et al., "A Digital Network Architecture Overview", *Digital Technical Journal*, No. 3, Sep. 1986, pp. 10-24.
*LAN Bridge 100 Technical Manual*, (Digital Equipment Corporation 1987), pp. 3-1 to 3-47.

*Primary Examiner*—Michael R. Fleming
*Assistant Examiner*—Debra A. Chun
*Attorney, Agent, or Firm*—Fish & Richardson

[57] ABSTRACT

Apparatus for processing a stream of bits including a hardware comparator that compares first predetermined bits of the stream, comparison input means to provide a table of comparison values to said hardware comparator for comparison with said predetermined bits of said stream, the comparison input means being programmmable to provide one of a plurality of different tables in response to a table select control signal, an index generator for generating an index based on the states of the predetermined bits, and a processor for accessing the index and processing a group of the bits in at least one of a plurality of different ways based on the index.

42 Claims, 6 Drawing Sheets

Cache Logic Flow

FIG. 5

Do Forever:

Fetch specified Control Entry

Fetch corresponding Table Entry to cache

While no buffers available or no more enabled entries exist in table entry:

Wait

End Do

---

Mark First Fetched Table Entry as Current

Do Forever:

While Current Entry is Still in use:

Wait

Mark Next Entry as Current

Mark most recently used buffer as available

End Do

Chip Control Logic Flow

FIG. 6

Start:

Select next Ring Buffer

While more Control Entries to process:

Set Start Bit according to Start Bit field in Control Entry

Set Stop Bit according to Length Field in Control Entry

Start Compare

Store Result (Index) through Cache State Machine
or
Replace Field
or
Discard Packet Select Outputs from Output Select field in Table Entry If specified, generate Host interrupt Select next Control Entry End While

APPARATUS FOR PROCESSING BIT STREAMS

This is a continuation of co-pending application Ser. No. 07/200,698 filed on May 31, 1988, now abandoned.

BACKGROUND OF THE INVENTION

The invention relates to apparatus for processing relating to a stream of bits.

Bits in a stream that are transmitted from one processor to another typically need to be filtered (i.e., analyzed to determine what they mean) and processed in some manner based upon the result of the filtering. E.g., in a computer network (e.g., as described in Tanenbaum, A. S., *Computer Networks*, (Prentice-Hall, Inc. 1981), pp. 10–28 ("Tanenbaum")), the filtering of an incoming bit stream occurs in the lower layers of the network processor at a node; if the incoming bits are identified as being of interest to the node (e.g., having a destination address associated with the node in an address field of a frame of bits), the bits are stored and later used by upper layers.

In the local area network controller for Ethernet ("LANCE"), which is described in *MOS Microprocessors and Peripherals* 1985 *Data Book*, (Advanced Micro Devices, Inc., Sunnyvale, Calif. 1985) pp. 2–50 to 2–86 ("LANCE Specification", which is hereby incorporated by reference), the 48-bit Ethernet address is analyzed in a bit-by-bit compare, and frames that do not have addresses that match are discarded. When an address matches all the way through to the last bit in the address field, the frame is placed in data buffers for access by the upper layers. The upper layers do not know which address matched, only that one did. Thus the software associated with the upper layers must repeat the entire compare process.

SUMMARY OF THE INVENTION

In one aspect the invention features in general processing a bit stream by using a hardware comparator that compares first predetermined bits of a bit stream (e.g., a field of a frame), an index generator that generates an index based on the states of the predetermined bits, and a processor that accesses the index and processes a group of bits of the stream (e.g., a frame) in one of a plurality of different ways based upon the index. The processor thus need not compare the entire set of predetermined bits in order to determine how the group of bits should be processed, but simply accesses the index, which includes that information. The comparison involves comparison against a table of comparison values that are provided to the hardware comparator, and one of a plurality of different tables is provided in response to a table select control signal, providing great flexibility in filtering the bit stream.

In preferred embodiments, the predetermined bits that are compared could be, e.g., a destination address field indicating the intended recipient, a protocol field, or a field identifying a data compression algorithm. There also could be comparison of predetermined bits that identify a special message relating to management of a processor. There can be data buffers that receive and store portions of the bit stream and descriptor storages associated with respective data buffers for storing descriptor entries relating to the data stored in the data buffers; the indexes can be stored in the descriptor storages associated with the data buffers for access by the processor. The comparator can be programmable to compare different fields of the bit stream in response to a field select control signal; the field select control signal can include a start signal location and a length signal designating the length of the bit field to be used in the compare; the processor can control the field select control signal. The tables can be selected in response to a value generated as the result of an initial comparison of a field. The comparisons can be advantageously controlled without direct involvement of a host computer by using a chip control state machine, a memory state machine, and a table memory in which are stored: tables of comparison values; entries identifying the predetermined bits being compared; entries indicating whether the group of bits should be discarded and whether interrupts should be generated upon completion of a comparison; entries indicating further comparisons to be made; entries indicating whether an index should replace the predetermined bits in the bit stream; and entries indicating where the group of bits should be routed (e.g., to a port to another network or to a data buffer). The invention can be employed in a bridge that has at least one port to a different network, the index identifying the port; the processor can translate the fields of the bits in one network's protocol into another network's protocol. Ring buffers can be used to temporarily store bits of the stream while the index is being generated.

In another aspect the invention features in general processing source data bits using a hardware comparator that compares predetermined bits of the source data bits, an index generator that generates an index based on the states of the predetermined bits, and a processor that accesses the index and modifies the source data bits in one of a plurality of different ways prior to transmitting the source data bits as a stream of bits.

In preferred embodiments the index can identify transmit data to be placed in a frame to be transmitted; the transmit data are placed in a frame at a field prescribed by a start location signal and a length signal. The index could alternatively identify a data compression algorithm.

Other advantages and features of the invention will be apparent from the following description of a preferred embodiment thereof and from the claims. The particular details of the example of the preferred embodiment should not be construed to limit the scope of this invention.

DESCRIPTION OF THE PREFERRED EMBODIMENT

The preferred embodiment will now be described.

Drawings

FIG. 5 is a flow description of cache logic of a cache state machine of the FIG. 3 circuit.

FIG. 6 is a flow description of chip control logic of a chip control state machine of the FIG. 3 circuit.

STRUCTURE AND OPERATION

Figure 1:
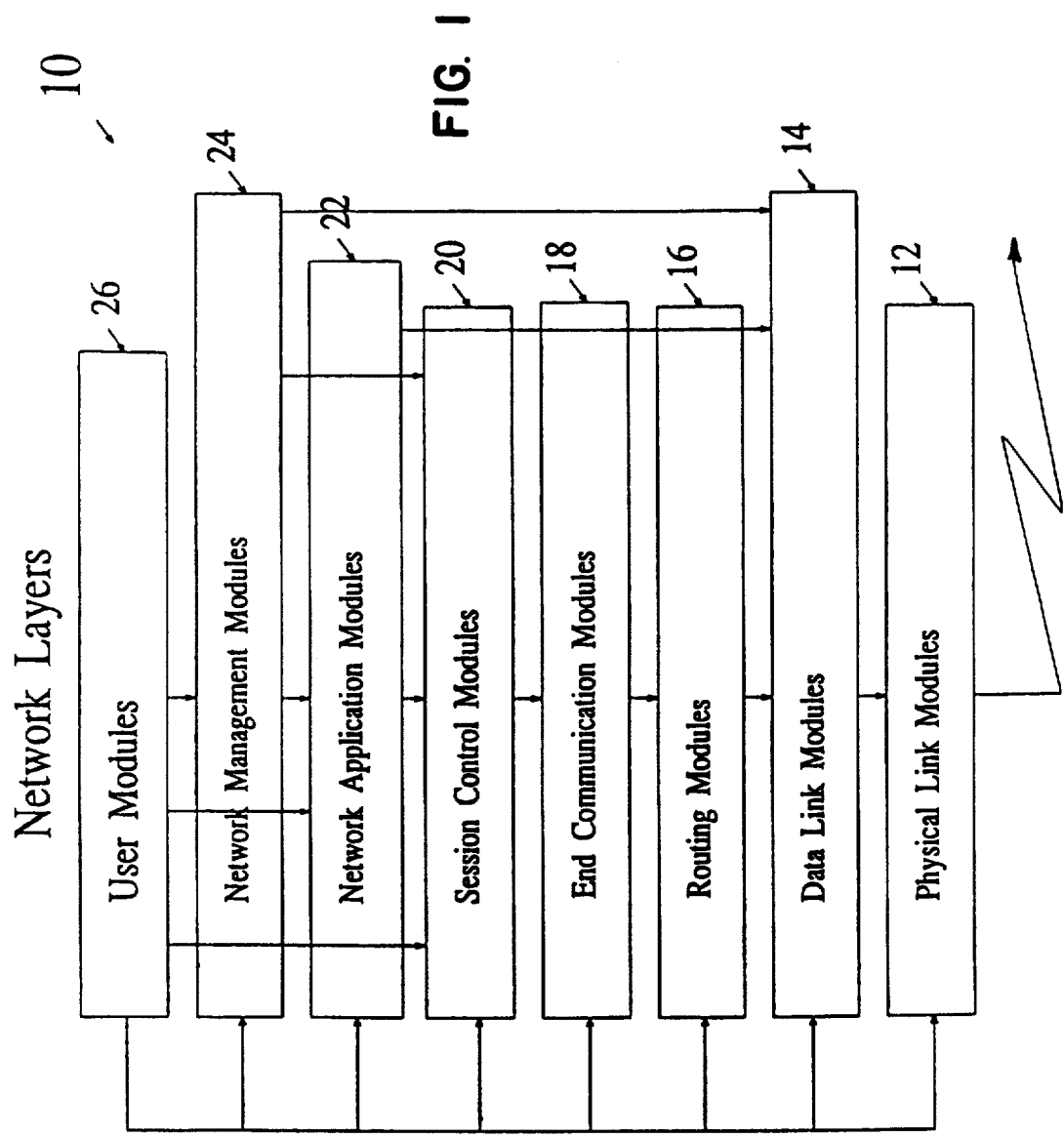
FIG. 1 is a block diagram of a node of a local area network employing bit stream filtering according to the invention.

Referring to FIG. 1, there is shown the network architecture for node 10 of a local area network, as described in Lauck, A. G., et al. "A Digital Network Architecture Overview", *Digital Technical Journal*, Number 3, September, 1986, pp. 10-24 (which is hereby incorporated by reference). Node 10 includes physical link modules 12, data link modules 14, routing modules 16, end communication modules 18, session control modules 20, network application modules 22, network management modules 24, and user modules 26. As is described in Tanenbaum, the network is organized as a series of layers, each layer being built on its predecessor and offering certain services to higher layers and shielding those layers from the details of how the offered services are actually implemented. In addition to communication between adjacent layers, there also are control lines between nonadjacent layers.

Figure 2:
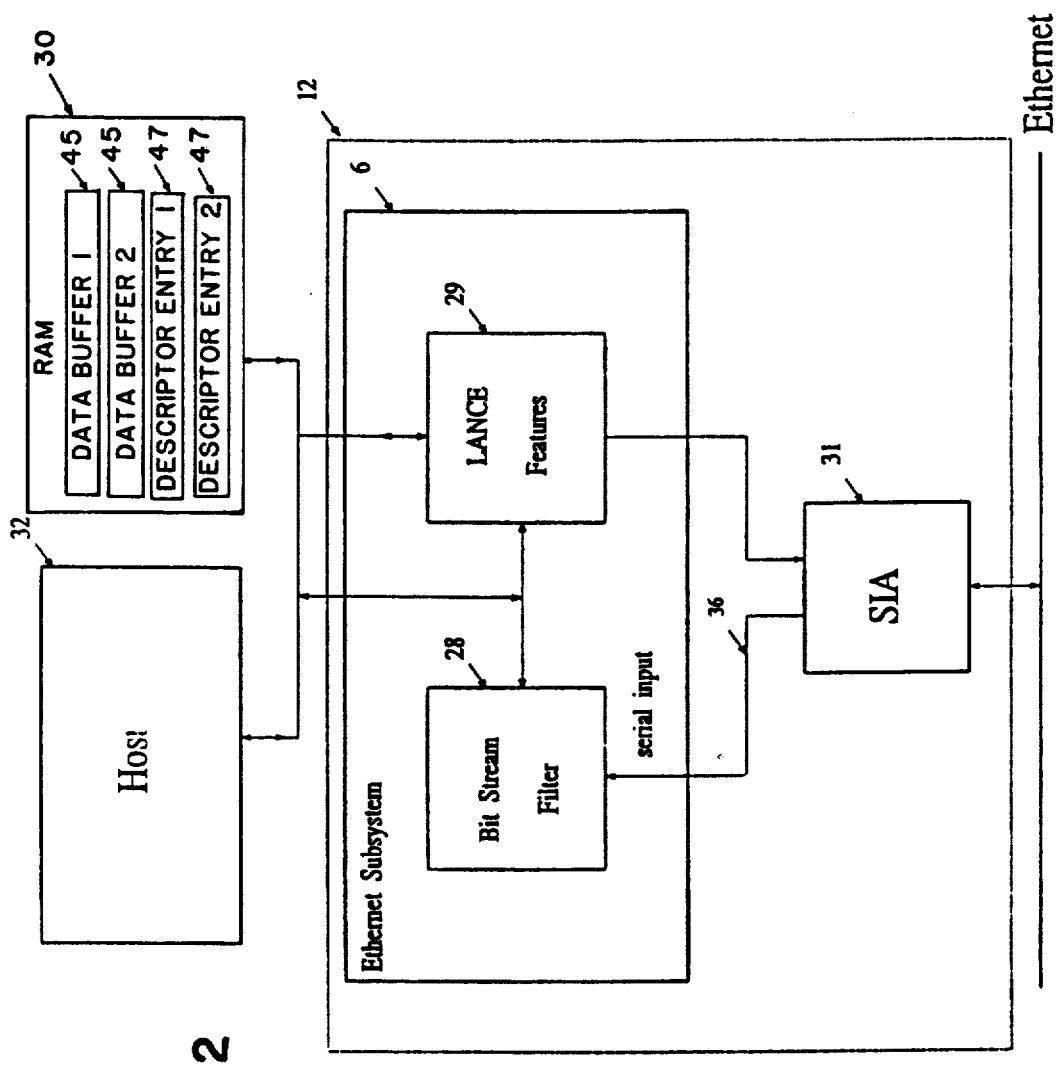
FIG. 2 is a block diagram showing a bit stream filtering circuit and related components at a node.
Figure 4:
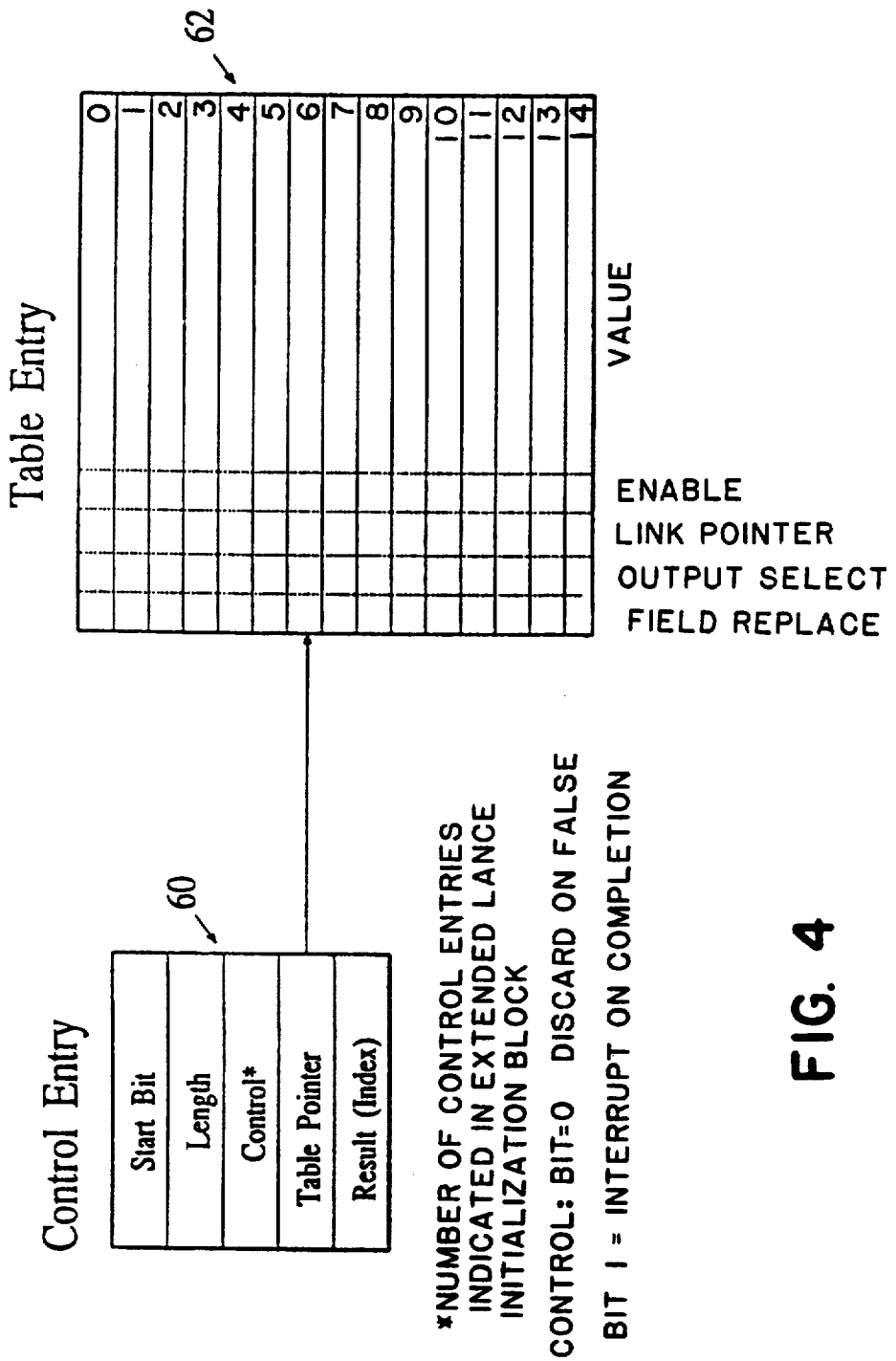
FIG. 4 is a diagram of a control entry and a table entry used in bit stream filtering according to the invention.

Referring to FIG. 2, bit stream filtering circuit 28 (an integrated circuit) resides in physical link modules 12 with LANCE features 29 (as described in the LANCE specification) and serial interface adapter ("SIA") 31 connected to other nodes via an Ethernet serial transmission line. Bit stream filtering circuit 28 filters, i.e., analyzes, the incoming bit stream from SIA 31 to generate an index indicating how the bit streams should be processed at the node. Bit stream filtering circuit 28 has access to random access memory ("RAM") 30, which is also accessed by upper layers and is controlled by host computer 32. Host computer 32 implements upper layers above physical link modules 12. Physical link modules 12 and RAM 30 can thus be accessed and controlled by upper layers. As is described in the LANCE specification, RAM 30 is used to provide memory locations for plural transmit and receive data buffers 45 (each buffer being used to store a frame, or portion of a frame, that has been received or will be transmitted) and descriptor storages for associated descriptor entries 47 that have pointers to respective data buffers 45 and characterize the data stored in the respective buffers 45. The LANCE descriptor entries have been extended to include control entries 60 (described in FIG. 4) relating to bit filtering according to the invention. Each descriptor entry potentially can have a plurality of associated control entries 60.

Figure 3:
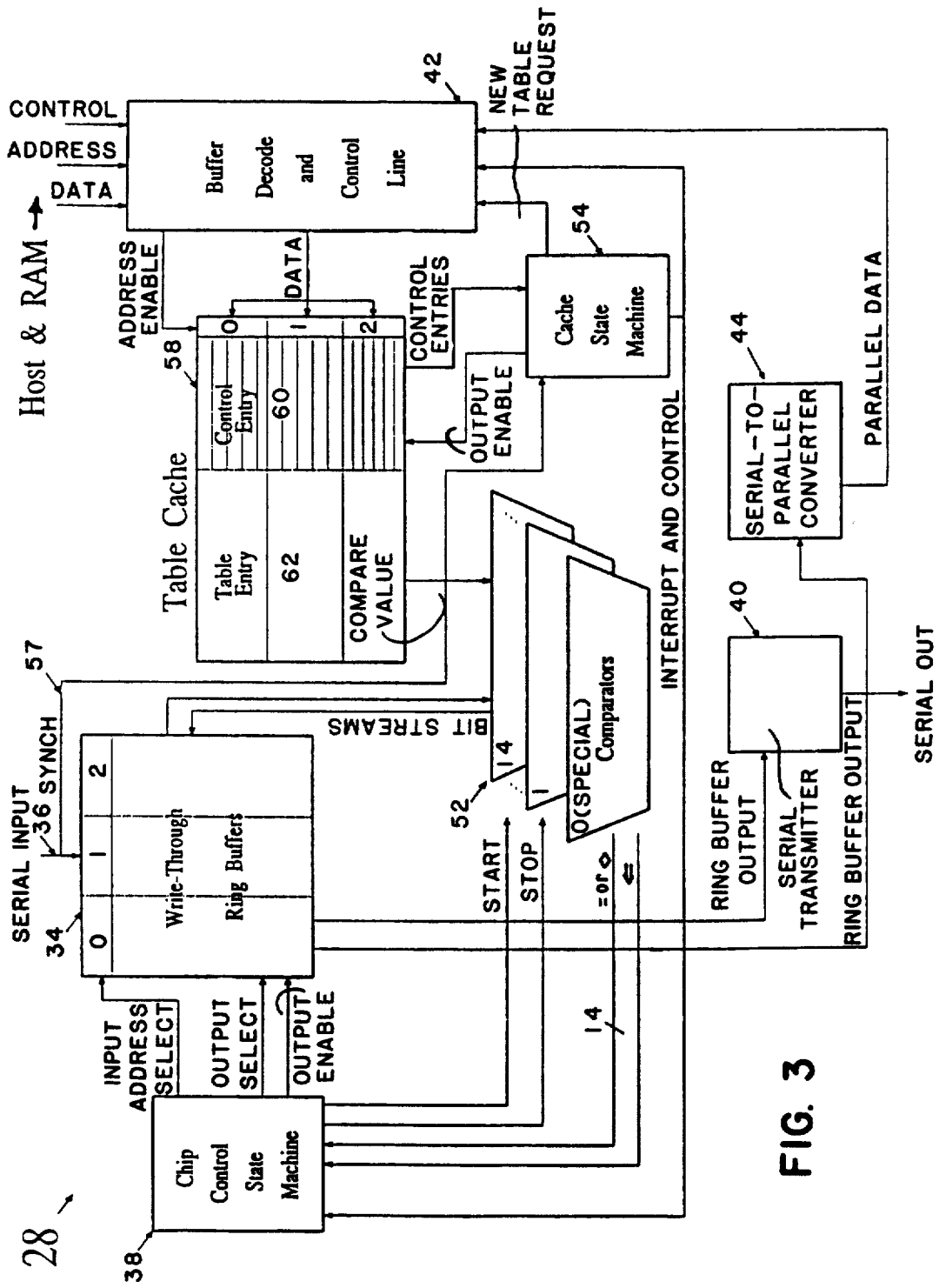
FIG. 3 is a block diagram showing the bit stream filtering circuit.

Referring to FIG. 3, bit stream filtering circuit 28 includes write-through ring buffers 34 for receiving a stream of bits over serial input line 36. Ring buffer select control is controlled by chip control state machine 38 to control routing of the bit stream to one of three ring buffers 34, which operate essentially as three shift registers that are each long enough to hold an Ethernet frame (1536 8-bit bytes). The output of ring buffers 34 is connected to serial transmitter 40 (for transmission of a serial bit stream to a separate network) and/or to serial-to-parallel converter 44. The data received from ring buffers 34 are provided by converter 44 in a parallel form for transfer through buffer decode and control line 42 to RAM 30.

Comparators 52 are controlled by chip control state machine 38. The bits traveling through a ring buffer 34 can be routed from a location between the ring buffer's input and output to pass through comparators 52 and be returned to the ring buffer 34 and continue traveling through it. Hardware comparators 52 compare predetermined bits (i.e., a field) with compare values loaded in table entries 62 in table cache memory 58 and indicate the results of the compares to chip control state machine 38. Chip control state machine 38 includes an index generator function to generate a 16-bit index based on the results of the compares. The index is stored in table cache memory 58 in the result field (FIG. 4) of a control entry 60 associated with the descriptor entry 47 for a data buffer 45 assigned to an incoming frame. Table cache memory 58 is controlled by cache state machine 54. Table cache memory 58 and cache state machine 54 thus comprise a comparison input means to provide a table of comparison values to comparators 52.

In operation, prior to receiving a frame (for example, from another node on the local area network) on serial input line 36, a control entry 60 is read from RAM 30 into table cache memory 58 via buffer decode and control line 42. The control entry (FIG. 4) includes "start bit" (identifying the start location of the field to be used for the compare), "length" (indicating the length of the field being compared), 2-bit "control" (to control chip actions after filtering has been completed: e.g., discard on false address comparison, interrupt host when finished), "table pointer" (identifying a table of comparison values to be stored in table cache memory 58 and used in the compare), and "result" (storage locations for receiving the 16-bit index). The descriptor entries 47 (including their control entries 60) stored in RAM 30 are determined by upper layers. Prior to receiving the frame, up to three tables of comparison values are stored in table cache memory 58 to be used by hardware comparators 52. The table pointer is used to fetch a table stored in RAM 30 and store it as the table entry 62 in table cache memory 58 associated with the control entry 60. The table pointer entry is thus used to generate a table select control signal used to select the table of comparison values. Table entries 62 (FIG. 4) include 14 comparison values (e.g., 48 bits if indicating Ethernet address) to be used by comparators 52 designated 1 to 14 in FIG. 3, and a further comparison value for use by a special comparator, discussed in detail below. Associated with each comparison value are (FIG. 4) an "enable" bit (indicating whether the value is to be used; e.g., there may be less than 14 comparison values in the table), and a 4-bit "link pointer" pointing to a further control entry 60 to be used in a further compare depending upon the results of an initial compare. Up to two link pointer entries can be used to identify two further control entries 60 to be initially fetched and stored in table cache memory 58. "Output select" indicates where to route the frame depending on the results of the compare. "Field replace" indicates whether the index generated should replace the field compared in the bit stream. If the first table entry 62 does include one or more table pointers identifying further control entries 60, they are fetched and stored in table cache memory 58, as indicated in the cache logic described in FIG. 5.

Node 10 can receive both Ethernet frames and frames meeting IEEE Standard 802.3 ("802.3 frames"). When the frame is received over input line 36, the frame goes into one of three ring buffers 34 as determined by chip control state machine 38. As indicated in the chip control logic described in FIG. 6, chip control state machine 38 uses the start bit and length of the control entry 60 to identify start and stop bits of the field compared by hardware comparators 52, which then compare the bits in the field identified as the bits are routed from a ring buffer 34 through comparators 52. The start bit and length bit stored in control entry 60 are thus used to generate a field select control signal to determine the field of bits that is compared. The bits are compared with bits of the comparison values of the table entry 62 in table cache memory 58, and a 16-bit index is generated by chip control state machine 38. For example, if the field being compared is the 48-bit destination Ethernet address, the table would include as values the 14 48-bit physical addresses that can be associated with node 10. The index is deposited by chip control state machine 38 in cache state machine 54, which in turn places the index in the result field in the respective control entry 60 in table cache memory 58.

Assuming the frame is to be temporarily stored in a data buffer 45 in RAM 30 and used by the upper layers at the node, the frame, upon leaving a ring buffer 34, is passed through serial-to-parallel converter 44 and buffer decode and control line 42 to the respective data buffer 45 in RAM 30. The result (index) of the control entry in table cache memory 58 is also placed in RAM 30, in the associated descriptor entry 47, which points to the respective data buffer 45. Synchronization and clocking of state machines 38, 54 are provided by the incoming bit stream, as indicated by synch line 57.

If the destination address does not match up with any of the 14 addresses in the table, the frame will be handled as determined by the state of the control field in control entry 60; e.g., the frame could be discarded. At the end of the compare, if the control field of the control entry 60 indicates interrupt, an interrupt is generated by chip control state machine 54 and provided to host 32. If the field replace entry of the table entry 62 is true, and, if there is a match, the index is used to replace the field that was compared in the frame.

The special comparator 52 (designated "0") is used to compare the 4-byte field in the incoming frame that is used either to indicate the length of the frame (if an 802.3 frame) or to identify protocol (if an Ethernet frame) to determine if the frame is an Ethernet frame or an 802.3 frame. If the value is less than or equal to the maximum length for an 802.3 frame, then the frame is identified as an 802.3 frame; if not, the frame is assumed to be an Ethernet frame; by convention all Ethernet protocol identifying numbers are greater than the maximum 802.3 frame length. The result of the special comparator can thus be used to select either the second table or third table in table cache memory 58 to be used in a further field comparison.

The initial index or the special comparator output thus might indicate that there should be a further compare on a different field using the second or third table stored in table cache memory 58, which table and field had been identified by link pointers and preloaded. Host 32 thus need not be interrupted, and different frames could be compared in different manners based upon the result of an initial compare without intervention by the host. A result (i.e., index) of an initial comparison can be stored in RAM 30 shortly after the initial comparison has been completed and before a frame has passed through ring buffers 34 and into a data buffer 45. At this time the associated table entry 62 and control entry 60 are no longer needed and can be deleted from table cache memory 58. The next comparison will use one of the two other table and control entries already stored, and the freed-up space in table cache memory 58 can be filled by a further table entry 62 and control entry 60 according to the cache logic of FIG. 5. The further control entry 60 and table entry 62 to be loaded are identified by an enabled link pointer in the presently used table entry 62. The results of the further comparison can also be stored in a descriptor entry 47 in RAM 30 and can be used to identify further comparisons. If necessary to do further compares, the frame can be fed back from a ring buffer output to a ring buffer input.

The upper layers of the node shown in FIG. 1 can access the data stored in RAM 30 and employ the indexes in the descriptor entry 47 to assist in and speed up processing. The upper layers thus function as a processor that accesses the index and processes bits in the frame in at least one of a plurality of different ways based on the index. For example, if the index identifies a destination address, there is no need to do a 48-bit software compare of the field of the destination address. The index could also identify a protocol which would be used by one of the upper layers in processing the data stored in the data buffer. The index could also identify a data compression algorithm, and an upper layer would expand the data according to the algorithm identified. The index could also indicate that the frame is to be transmitted via serial transmitter 40, acting as a bridge, to another network. In this case the use of three ring buffers 34 permits storage of a later frame while an earlier frame is being serially transmitted by transmitter 40 at a lower rate. Serial transmitter 40 can translate fields as bits pass through it. Comparators 52 could also identify a special message and generate an index related to management of the network and not related to a frame to be processed.

Other Embodiments

Other embodiments of the invention are within the scope of the following claims. For example, the comparison values could be generated by other means, the indexes could be used to process the bits in other ways, and the comparator output could be the index, in which case the comparator would also be functioning as an index generator.

Also, a hardware comparator could be used to process source data bits from upper layers before transmitting them. The comparator compares predetermined bits of the source data bits and generates an index used by a processor to modify the source data bits before transmitting them as a stream of data bits. E.g., the index can identify transmit data to be placed in a frame to be transmitted; the transmit data are placed in a frame at a field prescribed by a start location and a length signal. The index could alternatively identify a data compression algorithm.

What is claimed is:

1. Apparatus for processing a stream of bits that have plural possible states and are received over an input line comprising
   a hardware comparator that compares first predetermined bits of said stream at predetermined positions in a group of bits in said stream, said predetermined bits being fewer in number than all bits in said group,
   comparison input means to provide a table of comparison values to said hardware comparator for comparison with said predetermined bits of said stream,
   said comparison input means being programmable to provide one of a plurality of different tables stored therein in response to a table select control signal
   an index generator that receives a comparison output from said comparator and generates an index based on the states of said predetermined bits indicated by said comparison output, and a processor for accessing said index and processing said group of said bits in said stream of bits in at least one of a plurality of different ways based on said index.

2. The apparatus of claim 1 further comprising data buffers connected to receive and store portions of said bit stream, said processor being connected to access said data buffers.

3. The apparatus of claim 2 further comprising descriptor storages associated with respective said data buffers for storing descriptor entries relating to data stored in said data buffers.

4. The apparatus of claim 3 wherein a said descriptor storage is connected to receive and store said index.

5. The apparatus of claim 1 wherein said comparator is programmable to respond to a field select control signal so that the predetermined bits compared are a function of said field select control signal.

6. The apparatus of claim 5 wherein said field select control signal comprises a start location signal indicating the start bit of the field to be used for the compare, and a length signal indicating the length of the bit field to be used for the compare.

7. The apparatus of claim 5 wherein said processor comprises means for providing said field select control signal.

8. The apparatus of claim 1 wherein said comparison input means is programmable to provide a different said table in response to a value generated as the result of an initial comparison of predetermined bits of said stream of bits.

9. The apparatus of claim 1 wherein said comparison input means comprises a table memory in which tables of comparison values are stored.

10. The apparatus of claim 9 further comprising a separate memory in which table entries are stored, and wherein said table memory also stores a control entry identifying a table entry in said separate memory including a table of comparison values to be stored in said table memory.

11. The apparatus of claim 9 wherein an entry identifying the predetermined bits to be compared is also stored in said table memory.

12. The apparatus of claim 9 wherein an entry indicating whether said group of bits should be discarded based upon the results of said compare is also stored in said table memory.

13. The apparatus of claim 9 wherein an entry indicating whether an interrupt should be generated based upon the results of said compare is also stored in said table memory.

14. The apparatus of claim 9 wherein an entry identifying a further table of comparison values is also stored in said table memory.

15. The apparatus of claim 9 wherein an entry identifying whether an index should replace said predetermined bits in said bit stream is stored in said table memory.

16. The apparatus of claim 9 wherein an entry identifying where the group of bits should be routed is stored in said table memory.

17. The apparatus of claim 10 wherein said control entry also identifies the predetermined bits to be compared.

18. The apparatus of claim 10 wherein said table entry also identifies a further control entry to be stored in said table memory, said further control entry identifying a further table entry including comparison values to be stored in said table memory.

19. The apparatus of claim 9 wherein said comparison input means also comprises a memory state machine for loading table entries containing comparison values in said table memory and for providing said comparison values in said table memory to said comparator.

20. The apparatus of claim 10, 17, or 18 wherein said comparison input means also comprises a memory state machine for loading said entries in said table memory, for providing comparison values in said table memory to said comparator, and for deleting said entries after comparisons have been made and loading further entries in said table memory.

21. The apparatus of claim 19 wherein said index generator comprises a chip control state machine that generates said index and controls operation of said comparator.

22. The apparatus of claim 1 wherein said predetermined bits comprises a destination address of an intended recipient of said group of bits, said index identifies an intended recipient, and said processor comprises means responsive to said index for transmitting said group of bits to said intended recipient.

23. The apparatus of claim 1 wherein predetermined bits identify a protocol, said index identifies a protocol, and said processor comprises means responsive to said index for processing said group of bits according to said protocol.

24. The apparatus of claim 1 wherein said predetermined bits identify a data compression algorithm, said index identifies a data compression algorithm, and said processor comprises means responsive to said index for expanding said group of bits according to said algorithm.

25. The apparatus of claim 1 wherein said hardware comparator compares second predetermined bits of said stream that indicate a special message related to management of said processor, and wherein said processor comprises means for acting on said special message in response to it.

26. The apparatus of claim 1 wherein said processor comprises a bridge having at least one port to a different network, said index identifies a said port, and said processing includes transmitting said group of bits to said port.

27. The apparatus of claim 26 wherein said processor comprises means for translating fields of said group in one network's protocol into another network's protocol.

28. The apparatus of claim 1 further comprising ring buffers for temporarily storing bits of said bit stream while said index is being generated.

29. The apparatus of claim 1 further comprising means to provide an interrupt signal to said processing means upon completion of comparing said predetermined bits.

30. The apparatus of claim 1 wherein said apparatus comprises a node of a local area network.

31. The apparatus of claim 1 wherein said stream of bits comprises Ethernet frames.

32. The apparatus of claim 1 wherein said stream of bits comprises Ethernet frames and IEEE 802.3 frames, and said index identifies whether said group of bits is an Ethernet frame or an IEEE 802.3 frame.

33. Apparatus for processing source data bits for transmitting over an output line, said bits having plural possible states, said apparatus comprising a hardware comparator that compares predetermined bits at predetermined positions in a group of bits of said source data bits, said predetermined bits being fewer in number than all bits in a said group, comparison input means to provide a table of comparison values to said hardware comparator for comparison with said predetermined bits of said stream, said comparison input means being programmable to provide one of a plurality of different tables stored therein in response to a table select control signal, an index generator that receives a comparison output from said hardware comparator and generates an index based on the states of said predetermined bits indicated by said comparison output, and a processor for accessing said index and modifying said group of said source data bits in one of a plurality of different ways prior to converting said source data bits to a stream of bits to be transmitted.

34. The apparatus of claim 33 wherein said index identifies transmit data to be placed in a frame to be transmitted.

35. The apparatus of claim 34 wherein said transmit data is placed in said frame at a field prescribed by a start location signal and a field select aperture signal.

36. A circuit for filtering a stream of bits that have plural possible states and are received over an input line comprising a hardware comparator that compares first predetermined bits of said stream at predetermined locations in a group of bits in said stream, said predetermined bits being fewer in number than all bits in said group, comparison input means to provide a table of comparison values to said hardware comparator for comparison with said predetermined bits of said stream, said comparison input means being programmable to provide one of a plurality of different tables stored therein in response to a table select control signal, and an index generator that receives a comparison output from said comparison input means and generates an index based on the states of said predetermined bits indicated by said comparison output, said index indicating one of a plurality of different ways that said group of said bits in said stream of bits is to be processed by an external processor.

37. The apparatus of claim 36 wherein said comparator is programmable to respond to a field select control signal so that the predetermined bits compared are a function of said field select control signal.

38. The circuit of claim 36 wherein said comparison input means comprises a table memory in which table entries including said comparison values are stored.

39. The apparatus of claim 38 further comprising a separate memory in which table entries are stored, and wherein said table memory also stores a control entry identifying a table entry in said separate memory including a table of comparison values to be stored in said table memory.

40. The apparatus of claim 38 wherein said comparison input means also comprises a memory state machine for loading said entries in said table memory and for providing comparison values in said table memory to said comparators.

41. The circuit of claim 38 or 39 wherein said comparison input means also comprises a memory state machine for loading said entries in said table memory, for providing comparison values in said table memory to said comparators, and for deleting said entries and loading further entries in said table memory after comparisons have been made.

42. A method of processing a stream of bits that have plural states and are received over an input line comprising providing a table of comparison values to a hardware comparator for comparison with predetermined bits of said stream at predetermined positions in a group of bits in said stream, said predetermined bits being fewer in number than all bits in said group, the table being provided by selecting from a plurality of stored tables depending on a table select control signal, comparing first predetermined bits of said stream using a hardware comparator, generating an index based on the states of said predetermined bits indicated by a comparison output of said hardware comparator, and accessing said index and processing a group of said bits in said stream of bits in at least one of a plurality of different ways based on said index.

* * * * *

UNITED STATES PATENT AND TRADEMARK OFFICE
CERTIFICATE OF CORRECTION

PATENT NO. : 5,146,560
DATED : September 8, 1992
INVENTOR(S) : Goldberg, et. al.

It is certified that error appears in the above-indentified patent and that said Letters Patent is hereby corrected as shown below:

Title page, item [63], under Related U.S. Application Data, "1989" should be -- 1988--.

Signed and Sealed this

Ninth Day of August, 1994

Attest:

BRUCE LEHMAN

*Attesting Officer*     *Commissioner of Patents and Trademarks*